United States Patent
Reynolds

(10) Patent No.: US 11,277,499 B2
(45) Date of Patent: Mar. 15, 2022

(54) SYSTEMS AND METHODS FOR PERFORMING SIMULATIONS AT A BASE STATION ROUTER

(71) Applicant: CACI, Inc.—Federal, Arlington, VA (US)

(72) Inventor: David S. Reynolds, Castle Rock, CO (US)

(73) Assignee: CACI, Inc.—Federal, Arlington, VA (US)

( * ) Notice: Subject to any disclaimer, the term of this patent is extended or adjusted under 35 U.S.C. 154(b) by 148 days.

(21) Appl. No.: 16/587,267

(22) Filed: Sep. 30, 2019

(65) Prior Publication Data
US 2021/0099552 A1 Apr. 1, 2021

(51) Int. Cl.
| | |
|---|---|
| H04L 29/06 | (2006.01) |
| H04W 16/22 | (2009.01) |
| H04W 92/04 | (2009.01) |
| H04W 88/10 | (2009.01) |
| H04W 24/06 | (2009.01) |
| G06N 20/00 | (2019.01) |
| H04W 88/08 | (2009.01) |
| H04L 29/08 | (2006.01) |
| H04L 12/46 | (2006.01) |
| G06N 5/04 | (2006.01) |
| H04L 12/947 | (2013.01) |
| H04L 69/08 | (2022.01) |

(Continued)

(52) U.S. Cl.
CPC ............... *H04L 69/08* (2013.01); *G06N 5/04* (2013.01); *G06N 20/00* (2019.01); *H04L 12/4625* (2013.01); *H04L 49/25* (2013.01); *H04L 69/321* (2013.01); *H04W 16/22* (2013.01); *H04W 24/06* (2013.01); *H04W 88/08* (2013.01); *H04W 88/10* (2013.01); *H04W 92/045* (2013.01)

(58) Field of Classification Search
CPC ....... H04L 69/08; H04L 69/321; G06N 20/00; G06N 5/04; H94L 12/4625; H04W 16/22; H04W 24/06; H04W 88/08; H04W 88/10; H04W 92/045
See application file for complete search history.

(56) References Cited

U.S. PATENT DOCUMENTS

| 2003/0148761 A1* | 8/2003 | Gaal ...................... G01S 19/23 455/423 |
| 2012/0007776 A1* | 1/2012 | Ariel ...................... G01S 19/11 342/357.48 |

(Continued)

*Primary Examiner* — Christopher M Crutchfield
*Assistant Examiner* — Tito Q Pham
(74) *Attorney, Agent, or Firm* — BakerHostetler; Tayan B. Patel

(57) ABSTRACT

The present disclosure pertains to a base station (BS) apparatus configured to provide communication for one or more user equipment (UEs). Some embodiments of this apparatus may include: a BS networking device configured to access actual wireless data pertaining to actual UEs and to access simulated wireless data pertaining to simulated UEs; an interface controller communicably interposed between the BS networking device and the UEs, the interface controller being configured to control the access to the actual wireless data and the simulated wireless data; and a bridging device configured to convert between a wireless protocol used by the UEs and a wired protocol used by the BS networking device.

19 Claims, 5 Drawing Sheets

(51) Int. Cl.
*H04L 69/321* (2022.01)
*H04L 49/25* (2022.01)

(56) References Cited

U.S. PATENT DOCUMENTS

| | | | | |
|---|---|---|---|---|
| 2012/0282862 | A1* | 11/2012 | Wigard | H04W 52/0258 |
| | | | | 455/67.11 |
| 2014/0274194 | A1* | 9/2014 | Nakamura | H04W 52/228 |
| | | | | 455/522 |
| 2014/0298366 | A1* | 10/2014 | Chen | H04L 65/80 |
| | | | | 725/14 |
| 2015/0085690 | A1* | 3/2015 | Yi | H04W 24/02 |
| | | | | 370/252 |
| 2015/0281984 | A1* | 10/2015 | Takizawa | H04B 17/3912 |
| | | | | 455/67.14 |
| 2015/0350923 | A1* | 12/2015 | Wang | H04W 16/18 |
| | | | | 370/254 |
| 2019/0059007 | A1* | 2/2019 | Chockalingam | H04L 67/12 |
| 2020/0145838 | A1* | 5/2020 | Lerbour | H04W 16/22 |
| 2020/0335988 | A1* | 10/2020 | Minardi | H04W 76/10 |

* cited by examiner

SYSTEMS AND METHODS FOR PERFORMING SIMULATIONS AT A BASE STATION ROUTER

TECHNICAL FIELD

The present disclosure generally relates to systems and methods for preparing and performing simulations for a networking system that can be enhanced with machine learning techniques. More particularly, the disclosed approach relates to the development and testing of base stations, which support wireless communications, by simulating its wireless environment and by enabling machine learning of features of the communications system.

BACKGROUND

Development and complex, functional testing of base station networking devices (e.g., routers) for wireless (e.g., cellular) communications systems is exceedingly difficult, especially when considering that developers and testers lack ability to control or realistically simulate all aspects and constraints of an environment (e.g., in the wireless spectrum) of the base station. There is thus a need for sufficient control of a base station's wireless environment to effectively test one-off scenarios, such as when a new, legitimate base station or a rogue, fraudulent base station is introduced into an existing network, a base station appears having an unknown neighbor list, and a mobile device appears having specific communication problems, etc.

Further, the cost of base station hardware limits their availability for development and testing, which exacerbates the need. And control of an actual, wireless environment is generally impractical because of physical limitations, government or legal constraints, and prohibitive costs associated with such activities. As a result, problems are often left unresolved until production systems go live, which may cause unacceptable consequences.

The development of machine learning algorithms, for use in controlling or enhancing wireless systems, may also be complicated for the same reasons. That is, without the ability to provide an environment with a known, controlled state, it is difficult to capture suitable data and train a learning system. The lack of a controlled environment or a realistic, simulated environment prevents an ideal solution.

SUMMARY

Systems and methods are disclosed for providing a base station (BS) apparatus configured to facilitate communication for one or more user equipment (UEs). Accordingly, one or more aspects of this apparatus may include: a base station networking device configured to access actual wireless data pertaining to actual UEs and to access simulated wireless data pertaining to simulated UEs; an interface controller communicably interposed between the base station networking device and the UEs, the interface controller being configured to control the access to the actual wireless data and the simulated wireless data; and a bridging device configured to convert between a wireless protocol used by the UEs and a wired protocol used by the BS networking device.

The method is implemented by a system comprising one or more hardware processors configured by machine-readable instructions and/or other components. The system comprises the one or more processors and other components or media, e.g., upon which machine-readable instructions may be executed. Implementations of any of the described techniques may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

DETAILED DESCRIPTION

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other.

Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

Figure 1:
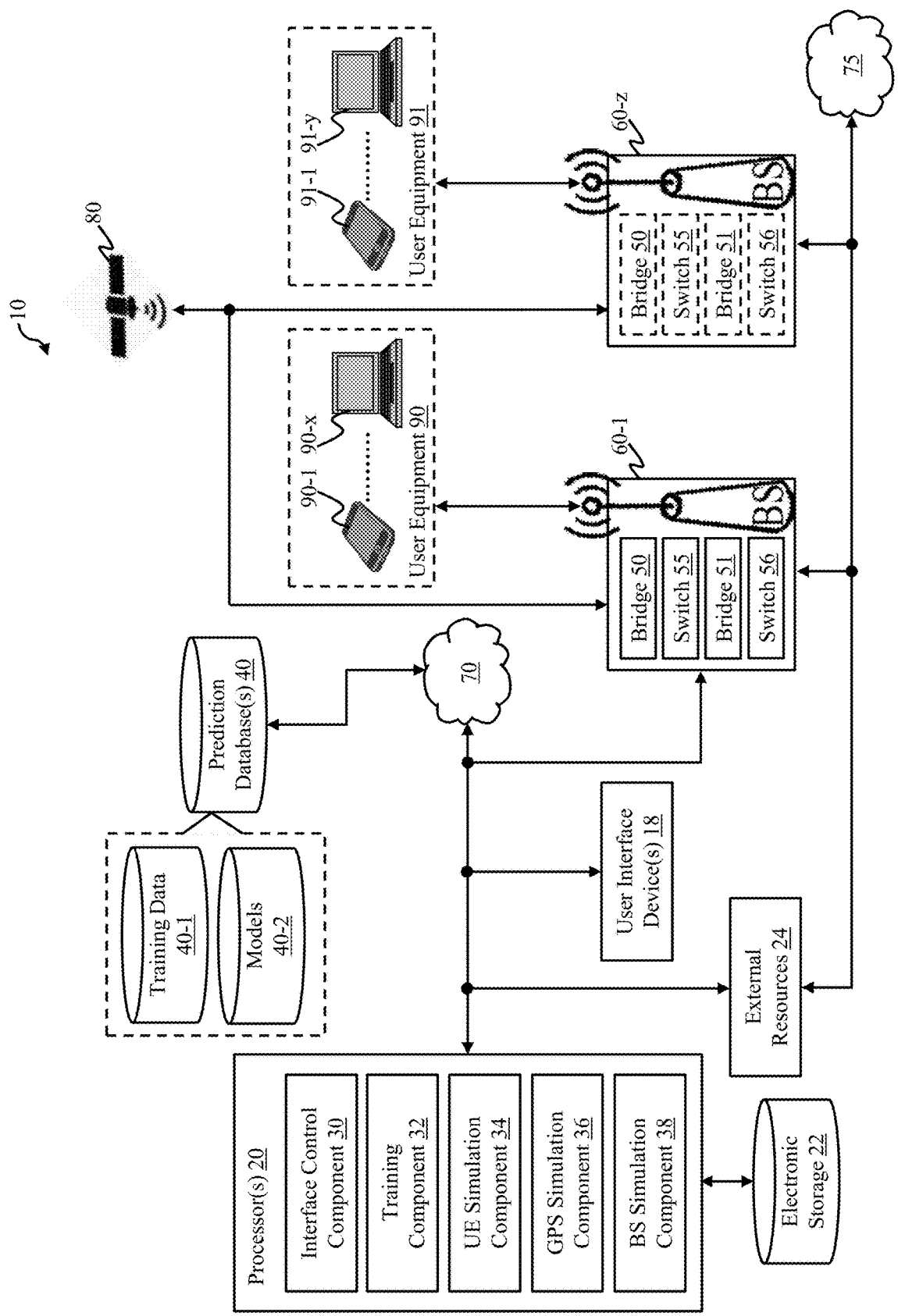
FIG. 1 illustrates an example of a system comprising base stations, user equipment, and a satellite that may be simulated by means of processing equipment and interface control switches, in accordance with one or more embodiments.

Presently disclosed are ways of implementing a controlled environment for development, testing, and training of base station networking devices. FIG. 1 illustrates system 10 configured to (i) transport wirelessly received data over wired means (e.g., while maintaining the same formatting of the wireless data, such as cellular traffic, after conversion at a physical layer), (ii) implement a base station networking device that internally uses, e.g., an Ethernet (i.e., not radio frequency (RF)) interface for supporting wireless traffic, and/or (iii) support different combinations of real and virtual base stations and of real and virtual user equipment (UEs). Some embodiments of system 10 may provide a simulated environment with a known, controlled state, making it easier to capture suitable data and train a learning system. FIG. 1 thus further illustrates system 10 configured to prepare and use one or more prediction models that learn optimal operating parameters for a base station networking device and that learn presence of fraudulent devices (e.g., satellites, base stations, UEs, or another networking device).

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface device 18, processor 20, etc.). In some embodiments, electronic storage 22 may be located in a server together with processor 20, in a server that is part of external resources 24, in user interface devices 18, and/or in other locations. Electronic storage 22 may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 22 may store software algorithms, information obtained and/or determined by processor 20, information received via user interface devices 18 and/or other external computing systems, information received from external resources 24, and/or other information that enables system 10 to function as described herein.

External resources 24 may include sources of information (e.g., databases, websites, etc.), external entities participating with system 10, one or more servers outside of system 10, a network, electronic storage, equipment related to Wi-Fi technology, equipment related to Bluetooth® technology, data entry devices, a power supply, a transmit/receive element (e.g., an antenna configured to transmit and/or receive wireless signals), a network interface controller (NIC), a display controller, a graphics processing unit (GPU), a radio (e.g., a software-defined radio), and/or other resources. In some implementations, some or all of the functionality attributed herein to external resources 24 may be provided by other components or resources included in system 10. Processor 20, external resources 24, user interface device 18, electronic storage 22, network 70, base stations 60, and/or other components of system 10 may be configured to communicate with each other via wired and/or wireless connections, such as a network (e.g., a local area network (LAN), the Internet, a wide area network (WAN), a radio access network (RAN), a public switched telephone network (PSTN)), cellular technology (e.g., GSM, UMTS, LTE, 5G, etc.), Wi-Fi technology, another wireless communications link (e.g., radio frequency (RF), microwave, infrared (IR), ultraviolet (UV), visible light, cmWave, mmWave, etc.)), a base station, and/or other resources.

User interface device(s) 18 of system 10 may be configured to provide an interface between one or more users and system 10. User interface devices 18 are configured to provide information to and/or receive information from the one or more users. User interface devices 18 include a user interface and/or other components. The user interface may be and/or include a graphical user interface configured to present views and/or fields configured to receive entry and/or selection with respect to particular functionality of system 10, and/or provide and/or receive other information. In some embodiments, the user interface of user interface devices 18 may include a plurality of separate interfaces associated with processors 20 and/or other components of system 10. Examples of interface devices suitable for inclusion in user interface device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that user interface devices 18 include a removable storage interface. In this example, information may be loaded into user interface devices 18 from removable storage (e.g., a smart card, a flash drive, a removable disk) that enables users to customize the implementation of user interface devices 18.

In some embodiments, user interface devices 18 are configured to provide a user interface, processing capabilities, databases, and/or electronic storage to system 10. As such, user interface devices 18 may include processors 20, electronic storage 22, external resources 24, and/or other components of system 10. In some embodiments, user interface devices 18 are connected to a network (e.g., the Internet). In some embodiments, user interface devices 18 do not include processor 20, electronic storage 22, external resources 24, and/or other components of system 10, but instead communicate with these components via dedicated lines, a bus, a switch, network, or other communication means. The communication may be wireless or wired. In some embodiments, user interface devices 18 are laptops, desktop computers, smartphones, tablet computers, and/or other user interface devices.

Data and content may be exchanged between the various components of the system 10 through a communication interface and communication paths using any one of a number of communications protocols. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol Version 4 (IPv4) and Internet Protocol Version 6 (IPv6).

In some embodiments, processor 20 may belong to a user device, a consumer electronics device, a mobile phone, a smartphone, a personal data assistant, a digital tablet/pad computer, a wearable device, a personal computer, a laptop computer, a notebook computer, a work station, a server, a high performance computer (HPC), a vehicle computer, a game or entertainment system, a set-top-box or any other device. As such, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, user interface devices 18, devices that are part of external resources 24, electronic storage 22, and/or other devices).

As shown in FIG. 1, processor 20 is configured via machine-readable instructions to execute one or more computer program components. The computer program components may comprise one or more of interface control component 30, training component 32, UE simulation component 34, global positioning system (GPS) simulation component 36, base station (BS) simulation component 38, and/or other components. Processor 20 may be configured to execute components 30, 32, 34, 36, and/or 38 by: software; hardware; firmware; some combination of software, hardware, and/or firmware; and/or other mechanisms for configuring processing capabilities on processor 20.

It should be appreciated that although components 30, 32, 34, 36, and 38 are illustrated in FIG. 1 as being co-located within a single processing unit, in embodiments in which processor 20 comprises multiple processing units, one or more of components 30, 32, 34, 36, and/or 38 may be located remotely from the other components. For example, in some embodiments, each of processor components 30, 32, 34, 36, and 38 may comprise a separate and distinct set of processors. The description of the functionality provided by the different components 30, 32, 34, 36, and/or 38 described below is for illustrative purposes, and is not intended to be limiting, as any of components 30, 32, 34, 36, and/or 38 may provide more or less functionality than is described. For example, one or more of components 30, 32, 34, 36, and/or 38 may be eliminated, and some or all of its functionality may be provided by other components 30, 32, 34, 36, and/or 38. As another example, processor 20 may be configured to execute one or more additional components that may perform some or all of the functionality attributed below to one of components 30, 32, 34, 36, and/or 38.

In some embodiments, a base station networking device may be a base station router (BSR) or another networking device of a central node. This base station equipment may conduct mobile telephony, wireless computer networking, and/or other wireless communications. In some embodiments, base station apparatus 60 may comprise one or more of a relay, station, repeater, hub, switch, repeater, bridge, router, and/or another networking device. In some embodiments, base station apparatus 60-1 may be configured to route traffic to and from UEs 90, base station apparatus 60-z, processor 20, and satellite 80.

In some embodiments, base station apparatus 60 may be comprised of a base station networking device and a set of other components. These components may include processors, busses, communication interfaces, interface enabling components (e.g., for multi-carrier communications), databases, memory devices, protocol converters, a power supply, antennas, and a tower, pole, or another suitable structure having sufficient dimension(s). The base station networking device forms part of known base station equipment, such as an E-UTRAN Node B or an evolved node (eNodeB). Each base station apparatus may comprise a plurality of antennas (e.g., at least 1 for cellular and at least 1 for the GPS).

In some embodiments, the base station networking device of base station apparatus 60 may comprise a plurality of different processors, such as a Linux control processor, common cellular processor, call control processor, and/or other suitable processor(s). The CCP may perform call control functionality (e.g., setup and teardown requests of a call), paging functionality, functionality of selector assignment and teardown, etc. according to known, mobile communication networks. The CCP may also manage information generated during call processing, e.g., including call status information of each selector, traffic channel address, selector address, assignment information, cell ID (identifier) information, and the like.

In some embodiments, base station apparatus 60 may comprise a user interface (UI) for the base station networking device. Via this UI, a user may control at least some features of base station apparatus 60.

In some embodiments, user equipment 90-91 may be a user device, a consumer electronics device, a mobile phone, a smartphone, a personal data assistant, a digital tablet/pad computer, a wearable device, a personal computer, a laptop computer, a notebook computer, a work station, a server, a high performance computer (HPC), a vehicle computer, a game or entertainment system, a set-top-box or any other device. In some embodiments, UEs 90-91 communicate wirelessly (e.g., via one or more antennas, base stations, repeaters, cellular over IP via Wi-Fi, etc.). In some embodiments, user equipment 90-91 may communicate with one or more of each other via service performed by base stations 60.

In some embodiments, base station 60-1 may communicate with user equipment 90-1 to 90-x (x being any set of natural numbers). Similarly, some embodiments of system 10 may comprise base station(s) 60-z (z being any set of natural numbers) communicating with user equipment 91-1 to 91-y (y being any set of natural numbers). These communications may be performed via a wireless connection of any suitable protocol. User equipment 91 may be in a different cell or region (e.g., of a respective base station) from user equipment 90.

In some embodiments, processor(s) 20 communicates locally with base station(s) 60 (e.g., LAN, bus, or another suitable networking protocol). In other embodiments, processor(s) 20 communicates remotely with base station(s) 60 (e.g., wired or wireless channel or network). UEs 90-91 may also communicate remotely from base station apparatus 60. As such, a data source may be local to or remote from the base station.

In some embodiments, base station apparatuses 60 may communicate with satellite(s) 80 via, e.g., GPS or another suitable satellite communications protocol in one or more RF and/or microwave bands. For example, base station apparatuses 60 may obtain forward link data from satellite(s) 80 and/or transmit return link data to satellite(s) 80.

In some embodiments, bridge component(s) 50 may convert actual wireless data received via one or more antennas from UEs 90-91 into packets or other protocol data units (PDUs), which are communicable to the base station networking device(s) via one or more wired (e.g., electrical, optical, etc.) means. Similarly, some embodiments of bridge component(s) 51 may convert actual wireless data received via one or more antennas from satellite 80 into PDUs, which are communicable to the base station networking device(s) via the one or more wired means. As such, bridges 50-51 may be coupled to respective inputs, i.e., from different antennas. Bridges 50-51 may each operate as a computer networking bridge that creates a single aggregate network from multiple communication networks or network segments.

In some embodiments, interface controller(s) 55-56 may make (e.g., restore, connect, etc.) or break (e.g., interrupt, disconnect, etc.) connections for network traffic. For example, interface controller 55 may switch PDUs between UE simulation component 34 (which may emulate user equipment as virtual UEs), user equipment 90, and the base station networking device in or more directions of PDU traffic flow. In another example, interface controller 56 may switch traffic between GPS simulation component 36 (which may emulate GPS devices as virtual satellites), satellite(s) 80, and the base station network device.

In some embodiments, interface controller 55 may comprise a hub, switch, repeater, bridge, or router. Similarly, some embodiments of interface controller 56 may comprise a hub, switch, repeater, bridge, or router. In some embodiments, switches 55-56 may be directly coupled at one interface to a base station network device, and they may be directly coupled at another interface to bridges 50-51, respectively.

In some embodiments, interface control component 30 may control interface controllers 55-56 in switching or relaying traffic to and/or from the base station networking device. For example, interface control component 30 may instruct interface controller 55 to: only receive and/or transmit traffic between user equipment 90 and the base station networking device; only receive and/or transmit traffic between UE simulation component 34 and the base station networking device; and/or receive and/or transmit traffic between user equipment 90, UE simulation component 34, and the base station networking device. In another example, interface control component 30 may instruct interface controller 56 to: only receive and/or transmit traffic between satellite 80 and the base station networking device; only receive and/or transmit traffic between GPS simulation component 36 and the base station networking device; and/or receive and/or transmit traffic between satellite 80, GPS simulation component 36, and the base station networking device.

In some embodiments, an interface of bridge 50 may implement one or more wireless protocols, such as 2G cellular, 3G cellular, 4G cellular, 4G long term evolution (LTE) cellular, 5G cellular, Wi-Fi, radio frequency identification (RFID), Bluetooth, and/or Zigbee. In some embodiments, another interface of bridge 50 may implement one or more wired protocols, such as Ethernet, universal serial bus (USB), synchronous optical networking (SONET), synchronous digital hierarchy (SDH), point-to-point protocol (PPP), high-level data link control (HDLC), digital subscriber line (DSL), integrated services digital network (ISDN), fiber distributed data interface (FDDI), and advanced data communication control procedures (ADCCP).

In some embodiments, at least some components of processor(s) 20 are integrated into base station apparatus 60. In these or other embodiments, at least some components of processor(s) 20 are distinct and separate from base station apparatus 60. As such, one or more of these software components may be used standalone or be integrated into an existing cellular system.

Some embodiments of system 10 include modifying existing hardware and software of a base station to support both an actual, physical environment and a virtual, simulated environment. A higher degree of controllability may be associated with the latter environment, which may represent a portion of the actual, physical environment and/or of another environment. In some embodiments, components 34, 36, and/or 38 of processors 20 may cause simulations that provide absolute control over a (e.g., closed) environment. A closed network is defined herein as any type of network that is not available to outside devices or networks and thus that does not include an actual, wireless environment. The closed network may be as simple as a single base station networking device and one piece of user equipment that communicates via Ethernet (wired) rather than cellular (wireless). But this closed network may be connected to another, actual base station networking device of another base station apparatus that is interfacing with the actual, wireless environment. The closed network may be controlled for performing simulations (e.g., a stand-alone simulation).

In some embodiments, processor(s) 20 may communicate with base station 60-1 and/or 60-z (z being any set of natural numbers). And base station 60-1 may communicate with at least some of base station 60-z and/or with network 75, network 75 exemplarily being the Internet or another WAN. These backhaul communications exemplarily depicted in FIG. 1 may be performed via a wired (e.g., Ethernet, coaxial, twisted-pair, bus, fiber optic, and/or another suitable network connection), wireless (e.g., microwave frequencies, RF, microwave, infrared (IR), ultraviolet (UV), visible light, cmWave, mmWave), mesh-topology, and/or edge-topology network or link. In some embodiments, processor 20's backhaul access may be facilitated by external resources 24.

In some embodiments, UE simulation component 34 may perform simulation of one or more user equipment. For example, UE simulation component 34 may generate and/or obtain traffic for testing the impact of interference on the base station networking device of an existing network. With respect to this generating, UE simulation component 34 may create simulated wireless data and transmit the simulated data by implementing virtual UEs. Alternatively or additionally, UE simulation component 34 may replay recorded, actual data. This actual, wireless data may comprise live data from existing or newly-installed cellular system(s). As such, the disclosed approach may exemplarily be performed by modifying an existing base station by inserting within it (or by coupling to it) bridges 50-51 and switches 55-56 and by supporting interface to processor(s) 20. The base station networking device may continue to process data as normal, without any consideration of the data source and without modification to its base code. This ensures that all testing and development is on actual hardware and software of a base station networking device, which improves the result and quality of final products.

In some embodiments, UE simulation component 34 may implement a controlled environment. For example, UE simulation component 34 may simulate multipath effects (e.g., in any RF band), different levels of congestion, many different user equipment including UEs associated with other networks or providers, interference from a variety of manmade sources like machinery and buildings, environmental sources like weather, canyons and effects of other topography, and even solar flares. UE simulation component 34 may thus simulate RF interference, e.g., by sending garbage data via a wired Ethernet interface to test whether the base station networking device is robust enough to maintain proper operation of other communication and to handle problems gracefully.

As it is impractical to control the physical environment of base stations and user equipment, some embodiments of UE simulation component 34 may generate simulated RF data, which is obtained as or converted to (e.g., Ethernet) packets, the conversion being exemplarily performed by bridge 50 of base station apparatus 60. Bridge 50 may exemplarily convert wireless signals to such packet format. As such, by incorporating switch 55 into base station apparatus 60, cellular signals may be received and transmitted over a wired protocol (e.g., Ethernet) without disrupting design of the base station network device. This incorporation may enable automated, repeatable scenario testing and development, and it may enhance the training of machine learning algorithms for wireless (e.g., cellular) systems.

In some embodiments, UE simulation component 34 may propagate actual cellular data as Ethernet packets to simulate the RF energy received by an antenna for testing of a base station networking device. For example, UE simulation component 34 may generate that data for transmission to switch 55, which may forward the data to the base station networking device under control of interface control component 30. Switch 55 may be further configured to process data to and/or from actual UEs 90.

Figure 2:
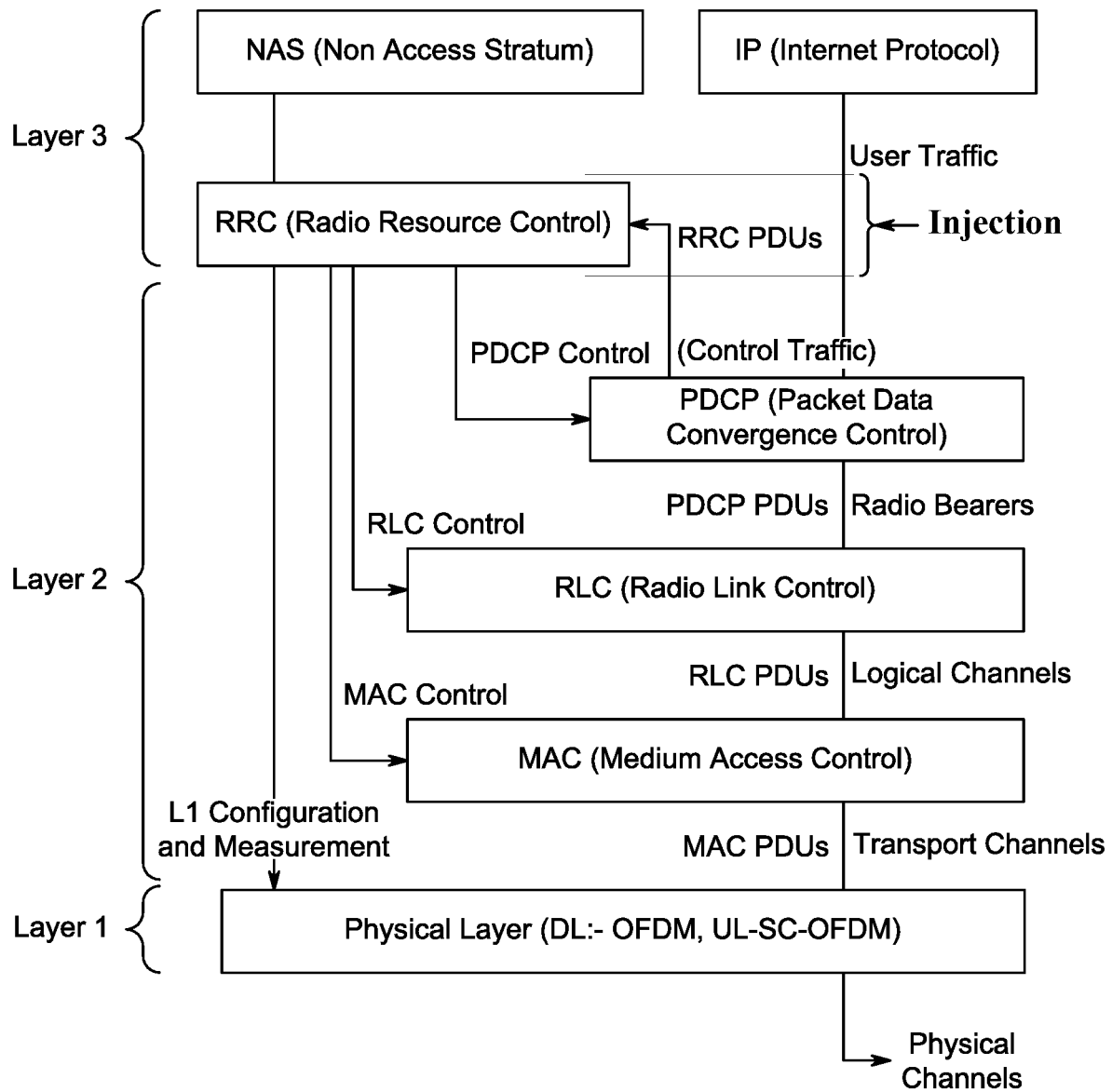
FIG. 2 illustrates an example of a protocol stack that may be modified for additionally supporting simulated traffic, in accordance with one or more embodiments.

In some embodiments, interface control component 30 may control switch 55 to switch between a physical source of cellular data and simulated cellular data, making it possible to provide a realistic, controlled environment for base station apparatus 60. For example, switch 55 may obtain Ethernet packets from a conversion output of bridge 50, for injecting these packets (which simulate wireless traffic) into a stack layer directly at the base station networking device. In this example, when obtaining Ethernet packets, the real cellular data may be stopped or blocked by automated control via interface control component 30 and/or by user control. Simulated, cellular data may exemplarily feed this existing RF chain (i.e., a stack of networking layers, at least a portion of which is depicted in FIG. 2) with data that base station apparatus 60 may expect. FIG. 2 thus exemplarily depicts injection (e.g., via a multiplexer that can select between converted cellular data and the payload of simulated wireless data, this selection potentially giving priority to the actual or simulated data) of Ethernet traffic at one, upper level of the LTE stack of the base station networking device. For the reverse direction, this stack may comprise an extractor that pulls data from the base station networking device and places this data into the payload of newly constructed Ethernet packets, for transmitting from base station apparatus 60.

In some embodiments, switch 55 may enable or disable real, cellular data. Similarly, in some embodiments, switch 56 may enable or disable real, GPS data. When enabled, these switches may cause the base station networking device to support real and simulated data simultaneously, providing more effective testing than can otherwise be performed with either form of this data. In some embodiments, switch 55 may selectively control the base station networking device's access to actual and simulated wireless data. As such, switch 55 may be communicably interposed between the base station networking device and the sources of actual and simulated RF data. Similarly, switch 56 may be communicably interposed between the base station networking device and the sources of actual and simulated GPS data.

Effectively, the base station networking device may not differentiate between actual data received from an antenna and simulated data received via a wired protocol. Complex scenarios that are impractical to reproduce in the physical world may then be simulated by system 10, for use in development of product solutions. That is, system 10 may not only facilitate standard testing but also one-off testing, e.g., with unique and custom constraints. These unique constraints may test performance of any setting or parameter of a base station networking device. For example, UE simulation component 34 may cause simulation of building interference for the base station networking device. In another example, UE simulation component 34 may cause simulation of a very large number of UEs (e.g., at a sports event).

In some embodiments, the base station networking device of base station apparatus 60 may switch signals via at least switch 55, which may be controlled by interface control component 30. For example, this switching may allow cellular data signals to come from actual UEs 90 and/or simulated UEs, which are simulated by UE simulation component 34. In some embodiments, interface control component 30 may control switches 55-56 and optionally even a switch for controlling traffic with respect to actual and simulated base stations. Interface control component 30 may comprise an application programming interface (API) for interaction with an overall simulation or automation tools, e.g., for supporting commands.

In some embodiments, UE simulation component 34 may obtain (e.g., before reaching the base station networking device) and store direct copies or records of the actual wireless (e.g., cellular RF) data into electronic storage 22. The actual data may be then used exemplarily as simulated wireless data in a simulation for the base station networking device. In some embodiments, UE simulation component 34 may capture actual traffic (e.g., from actual UEs 90) and then replay that traffic in a controlled way (e.g., via simulated UEs). In some embodiments, UE simulation component 34 may capture data that is strategically created to confirm that the result is correct (e.g., via one or more comparisons) and thus that the base station networking device is properly functioning. In some embodiments, UE simulation component 34 may control the simulated environment by restricting or causing interference (e.g., erroneous data).

In some embodiments, interface control component 30 and UE simulation component 34 may operate together to enable custom scenarios, injection of events, scenario replay, and/or automation. The disclosed approach may thus be automated, e.g., allowing for repetitive testing and verification with respect to intermittent problems. For example, a single test may be run many times to identify problems that only occur occasionally. And base station apparatus 60 may be tested for resolution of an intermittent problem by automatically varying one or more of base station networking device parameter settings, simulated wireless interference, and a number of the simulated UEs that are generating traffic to a level that satisfies a congestion criterion. In some embodiments, interface control component 30, training component 32, and UE simulation component 34 may operate together to enable prediction algorithms.

In some embodiments, UE simulation component 34 may simulate presence of one or more user equipment. For example, UE simulation component 34 may generate and/or receive traffic with same or similar characteristics as traffic to/from user equipment 90. In this example, the traffic may resemble cellular data. In some embodiments, UE simulation component 34 may obtain traffic recorded in electronic storage 22 for replaying or injecting at the base station networking device of base station apparatus 60. For example, UE simulation component 34 may facilitate complex, functional testing of the base station networking device under specific constraints. As such, data converted by bridge 50 or 51 may be stored for future playback at this local base station networking device or at the base station networking device of another base station apparatus.

In some embodiments, UE simulation component 34 may analyze reception of traffic from the base station networking device. In some embodiments, UE simulation component 34 may determine presence of one or more anomalies in actual traffic. UE simulation component 34 may then store this traffic at electronic storage 22, for subsequent testing of the base station networking device's ability to support this same traffic (e.g., after a repair is attempted). For example, the base station networking device may be modified in one or more different ways to produce alternative outcomes, with the same, actual test patterns being repeatably injected.

In some embodiments, GPS simulation component 36 simulates GPS data (e.g., by creating it with an algorithm or heuristic, by capturing actual GPS data then replaying, or by another means). For example, GPS simulation component 36 may prevent base station apparatus 60 from actually having to be in a particular location. This prevention, by causing emulation of base station apparatus 60 being in a different location, may be beneficial, e.g., in lab environments.

In some embodiments, GPS simulation component 36 may simulate presence of one or more satellites. For example, GPS simulation component 36 may generate and/or receive data with same or similar characteristics as data to/from satellite 80. In this example, the data may resemble GPS data. In some embodiments, GPS simulation component 36 may obtain data recorded in electronic storage 22 for replaying or injecting at the base station networking device of base station apparatus 60. In some embodiments, GPS simulation component 36 may analyze reception of data from the base station networking device.

An artificial neural network is a computational model that may, in some embodiments, be configured to determine and detect a base station networking device's proper response to network traffic (e.g., RF traffic, satellite traffic, and/or backhaul traffic). An artificial neural network is a network or circuit of artificial neurons or nodes for solving artificial intelligence (AI) problems by operating as learning algorithms that model the input-output relationship. Such artificial networks may be used for predictive modeling. The prediction models may be and/or include one or more neural networks (e.g., deep neural networks, artificial neural networks, or other neural networks), other machine learning models, or other prediction models. As an example, the neural networks referred to variously herein may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections may be enforcing or inhibitory, in their effect on the activation state of connected neural units. These neural network systems may be self-learning and trained, rather than explicitly programmed, and can perform significantly better in certain areas of problem solving, as compared to humans and traditional computer programs. In some embodiments, neural networks may include multiple layers (e.g., where a signal path traverses from input layers to output layers). In some embodiments, back propagation techniques may be utilized to train the neural networks, where forward stimulation is used to reset weights on the "front" neural units. In some embodiments, stimulation and inhibition for neural networks may be more free-flowing, with connections interacting in a more chaotic and complex fashion.

Disclosed implementations of artificial neural networks may apply a weight and transform the input data by applying a function, this transformation being a neural layer. The function may be linear or, more preferably, a nonlinear activation function, such as a logistic sigmoid, Tan h, or rectified linear activation function (ReLU) function. Intermediate outputs of one layer may be used as the input into a next layer. The neural network through repeated transformations learns multiple layers that may be combined into a final layer that makes predictions. This learning (i.e., training) may be performed by varying weights or parameters to minimize the difference between the predictions and expected values. In some embodiments, information may be fed forward from one layer to the next. In these or other embodiments, the neural network may have memory or feedback loops that form, e.g., a neural network. Some embodiments may adjust parameters via back-propagation.

In some embodiments, a convolutional neural network (CNN) may be used. A CNN is a sequence of hidden layers, such as convolutional layers interspersed with activation functions. Typical layers of a CNN are thus a convolutional layer, an activation layer, batch normalization, and a pooling layer. Each output from one of these layers is an input for a next layer in the stack, the next layer being, e.g., another one of the same layer or a different layer. For example, a CNN may have two sequential convolutional layers. In another example, a pooling layer (e.g., maximum pooling, average pooling, etc.) may follow a convolutional layer. When many hidden, convolutional layers are combined, this is called deep stacking.

Some embodiments may implement specific, machine-learning algorithms to a level acceptable for a particular application. For example, training component 32 may identify anomalous behavior on a network accessible by the base station networking device with a high level of accuracy. In this or other examples, training component 32 may employ a machine-learner that is well-trained to detect certain behavior. For example, model 40-2 may implement a machine learning (e.g., binary) classifier, including one or more of a naïve-Bayes classifier, self-organizing maps, clustering analysis, support vector machine (SVM), linear discriminant analysis, time frequency pattern analysis, singular value decomposition (SVD), artificial neural network, deep neural network (DNN), recurrent neural network (RNN), convolutional neural network (CNN), hidden Markov model (HMM), and Bayesian network (BN). This classifier may be an AI training model.

In some embodiments, models 40-2 may comprise machine learning models that are developed using simulated data (e.g., from electronic storage 22). The simulated data may thus help with the creation of the learning system because development needs known values to create and test a machine learning algorithm. With known, input values, developers of models 40-2 may compare actual results with expected results to see if the algorithm is working properly. Once created, these models may be further trained using actual wireless data (e.g., from UEs 90-91). That is, created models may be fed live data that acts as training data, i.e., when the training and learning of the model begins.

By capturing actual cellular traffic to collect training data and by playing back cellular traffic to develop machine learning algorithms at a base station networking device in a simulated RF environment, deep learning may be employed. For example, data statistics may be used to modify environmental parameters for enhanced communications. In another example, behavioral or pattern analysis may be applied to actual cellular data in a given area, e.g., to predict usage or capacity changes for the base station networking device. In some embodiments, prediction database 40 (e.g., which may include prediction algorithms or analysis of predictive behavior) may be utilized to determine a variety of different things. For example, training component 32 in conjunction with prediction database 40 may identify when a major sporting event is going to require more user capacity on a wireless system and/or determine that a suburb is going to require more capacity in the evenings.

The above-described machine learning approach may be applied on any interface of base station apparatus 60. For example, these techniques may be performed in relation to wireless data of both actual and simulated UEs. But this is not intended to be limiting, as the contemplated approach includes developing and training one or more machine learning models 40-2 that improve ability of the base station networking device to support actual and simulated satellites. Similarly, the contemplated approach includes developing and training one or more machine learning models 40-2 that improve ability of the base station networking device to support actual and simulated BSs. Further, models 40-2 may be developed and trained to detect fraudulent UEs, fraudulent satellites, and/or fraudulent base stations (BSs). As such, trained models 40-2 may be used to simulate a base station networking device's ability to properly process wireless data and to properly detect significant anomalies.

In some embodiments, training component 32 may generate and/or obtain training data 40-1. In some embodiments, training component 32 may, prior to training, divide or split training data 40-1 into a training dataset and a validation dataset, the subsequent training only be applied to the training dataset. Training component 32 may then train machine-learning models 40-2 to learn relevant features of network traffic. At least some of training data 40-1 may comprise actual traffic, whether this actual traffic be wireless (e.g., cellular, satellite, etc.) or wired (e.g., Ethernet backhaul).

In some embodiments, training component 32 may prepare one or more prediction models 40-2. In some embodiments, prediction model 40-2 may be used to analyze predictions against a reference set of data called the validation set. In some use cases, the reference outputs may be provided as input to the prediction models, which the prediction model may utilize to determine whether its predictions are accurate, to determine the level of accuracy or completeness with respect to the validation set data, or to make other determinations. Such determinations may be utilized by the prediction models to improve the accuracy or completeness of their predictions. In another use case, accuracy or completeness indications with respect to the prediction models' predictions may be provided to the prediction model, which, in turn, may utilize the accuracy or completeness indications to improve the accuracy or completeness of its predictions. For example, a labeled training set may enable model improvement. That is, the training model may use a training set of data to iterate over model parameters until the point where it arrives at a final set of parameters/weights to use in the model.

In some embodiments, training component 32 may perform modeling and/or model-tuning. Prediction models 40-2 (e.g., implementing a neural network) may be trained using training data 40-1 obtained by training component 32 from prediction storage/database 40 (or from electronic storage 22, external resources 24, and/or via user interface device(s) 18). The validation set may be a subset of training data 40-1, which is kept hidden from the model to test accuracy of the model. The test set may be a dataset of actual network traffic, which is new to the model to test accuracy of the model.

As mentioned, training component 32 may enable one or more prediction models to be trained. The training may be performed via several iterations. For each training iteration, a classification prediction may be determined and compared to the corresponding, known classification. For example, known simulated data may be input at system 10, during the training or validation, to determine whether the prediction model can properly predict a response (e.g., determine a coverage parameter, determine a capacity parameter, or identify a fraudulent node). As such, the neural network is configured to receive at least a portion of the training data as an input feature space. Once trained, model(s) 40-2 may be stored, as shown in FIG. 1, and then used subsequently with actual (e.g., live) network traffic.

In some embodiments, during training, training component 32 may use a labelled dataset to train both automatic feature extraction and classification. Preprocessing may depend on the choice of machine-learning classifier. Backpropagation may then be applied to the truth labels provided by the dataset, i.e., to train the network. Some embodiments may choose an optimizer on a per application basis.

In some embodiments, training component 32 may train on generic network metadata features, such as external IPs addressed, external ports addressed, TCP flags observed, protocols observed, etc.

Some embodiments may multiply pass the training data forwards and backwards. Once trained, the neural network may make predictions or inferences when fed input data. Some embodiments may implement artificial neural networks with one or more GPUs. And this is at least because neural networks are created from large numbers of identical neurons that are configured in parallel. This parallelism maps well to GPUs, which provide a significant computation speed-up over CPU-only training. As such, embodiments that include use of GPU(s) may enable closer to real-time capabilities of anomalous and/or fraudulent detection.

As depicted in FIG. 2, switch 55 may be added to protocol stack layer 2, 3, or another layer, in some implementations. In some embodiments, UE simulation components 34 may transmit and/or receive data to and/or from the base station networking device at the non-access stratum (NAS) level (e.g., layer 3 of an interconnection model such as the open systems interconnection (OSI) model). In other embodiments, UE simulation components 34 may transmit and/or receive data to and/or from the base station networking device at the radio resource control (RRC) level (e.g., layer 3 of the model). In other embodiments, UE simulation components 34 may transmit and/or receive data to and/or from the base station networking device at the IP level (e.g., layer 3 of the model). FIG. 2 thus depicts an injection of data at a network layer of an LTE protocol stack. But this is not intended to be limiting as any existing protocol stack may be similarly modified for supporting injection of simulated data. Further, another protocol stack may be similarly modified for supporting injection of simulated GPS data, and still another protocol stack may be similarly modified for supporting injection of simulated backhaul data. In some embodiments, a single protocol stack of the base station networking device may support wireless traffic of actual or simulated UEs, wireless traffic of actual or simulated satellites, and backhaul traffic of actual or simulated base stations.

In some embodiments, data is pulled from a suitable level or layer of the base station networking device. That is, rather than forwarding to user equipment 90-91, UE simulation components 34 may obtain this data to emulate reception of wireless data at a simulated user equipment. In other embodiments, UE simulation components 34 may transmit and/or receive data to and/or from the base station networking device using the packet data convergence protocol (PDCP) (e.g., layer 2 of the model). In other embodiments, UE simulation components 34 may transmit and/or receive data to and/or from the base station networking device via radio link control (RLC) (e.g., layer 2 of the model). In other embodiments, UE simulation components 34 may transmit and/or receive data to and/or from the base station networking device via medium access control (MAC) (e.g., layer 2 of the model). In other embodiments, UE simulation components 34 may transmit and/or receive data to and/or from the base station networking device at the physical layer (e.g., a lowest layer 1 of the model).

As depicted in FIG. 2, NAS is a functional layer in the UMTS and LTE wireless telecom protocol stacks between the core network and UEs. This layer may be used to manage the establishment of communication sessions and for maintaining continuous communications with the user equipment as it moves. NAS may be a protocol for messages passed between the UEs and core nodes, e.g., transparently through the radio network. The NAS protocol may support the mobility of the UE and the session management procedures to establish and maintain IP connectivity.

The RRC protocol is used in UMTS and LTE on the air interface, as a layer that exists between UE and base station and that exists at the IP level. The RRC protocol may be used to establish connection and release functions, broadcast system information, establish radio bearer, reconfigure and release, implement RRC connection mobility procedures, notify and release pages, and control outer loop power. The RRC may further configure the user and control planes according to a network status and allow for management strategies to be implemented.

RLC is a layer 2 protocol, being responsible for transfer of upper layer PDUs, error correction through ARQ, concatenation, segmentation, and reassembly. RLC may also be responsible for re-segmentation of RLC data PDUs, reordering of RLC data PDUs, duplicating detection, discarding data, re-establishing RLC, and detecting protocol error. RLC may operate in three modes: transparent mode (TM), unacknowledged mode (UM), and acknowledged mode (AM).

The MAC layer is another layer 2 protocol. More particularly, MAC is a sublayer that controls the hardware responsible for interaction with the wired, optical, or wireless transmission medium. The MAC may provide flow control and multiplexing. The MAC layer may be responsible for mapping between logical channels and transport channels, multiplexing of MAC data from one or different logical channels onto transport blocks (TB) to be delivered to the physical layer on transport channels, de-multiplexing of data from one or different logical channels from TBs delivered from the physical layer on transport channels, scheduling information reporting, error correction through HARQ, priority handling between UEs by means of dynamic scheduling, priority handling between logical channels of one UE, and logical channel prioritization.

The PDCP is specified by 3GPP. The PDCP may be located in the radio protocol stack in the air interface on top of the RLC layer. PDCP may provide its services to the RRC and user plane upper layers, e.g., IP at the UE or to the relay at the base station. PDCP may provide one or more of the following to upper layers: transfer of user plane data; transfer of control plane data; header compression; ciphering; and integrity protection.

In some embodiments, GPS and/or BS simulation components 36 and/or 38 may communicate at any suitable layer of the OSI model with the base station networking device.

In some embodiments, components 34, 36, and/or 38 may simulate hypothetical scenarios that cannot be tested in the real world, such as by repeatedly undergoing or adjusting atmospheric conditions that affect signal propagation and interference.

In some embodiments, BS simulation component 38 may implement one or more virtual base stations that communicate with one or more actual base station apparatuses 60 over a wired (or wireless) interface, such as the backhaul connection. In some implementations, this wired interface may use a same protocol (e.g., Ethernet) as used by switch 55 (and even switch 56, in some implementations). In other implementations, this wired interface may employ a different communications protocol. In implementations where the base station networking device forms part of an eNodeB, an X2 interface may be used to interface between the base stations.

In some embodiments, base station apparatus 60 comprises switches 55 and/or 56, and it may optionally comprise another switch for communication between the base station networking device and one or more virtual or actual BSs. In some embodiments, communication between base station apparatuses 60 may traverse one of the switches of the base station networking device. In some embodiments, simulated wireless data, actual wireless data, simulated GPS data, and/or actual GPS data may not require a switch for communicating with the base station networking device. In other embodiments, switch(es) or at least one other networking device may be used for this communication.

In some embodiments, BS simulation component 38 may store in electronic storage 22 actual data of the backhaul network that comprises communication to and/or from a rogue base station. For example, this base station may be detected to be fraudulent as such, after already having operated in this network. In some embodiments, BS simulation component 38 may then inject this stored communication data into the backhaul network to simulate ability of base station apparatus 60 to properly identify or detect another rogue base station. As a result, network operators may better manage a backhaul network. In some embodiments, BS simulation component 38 may be automated to more rapidly react to such nefarious nodes. And BS simulation component 38 may employ a model from database 40-2 to more quickly identify rogue base stations. In some embodiments, BS simulation component 38 may identify rogue base stations that operate via a wireless network, rather than through a wired backhaul network.

In some implementations, system 10 may be a standalone, cellular communications system used in emergency situations (e.g., after a natural disaster) to develop and test software under hypothetical scenarios, e.g., where environmental aspects are unstable or removed. For example, system 10 may be used to simulate or test effects of components coming back online.

Figure 3:
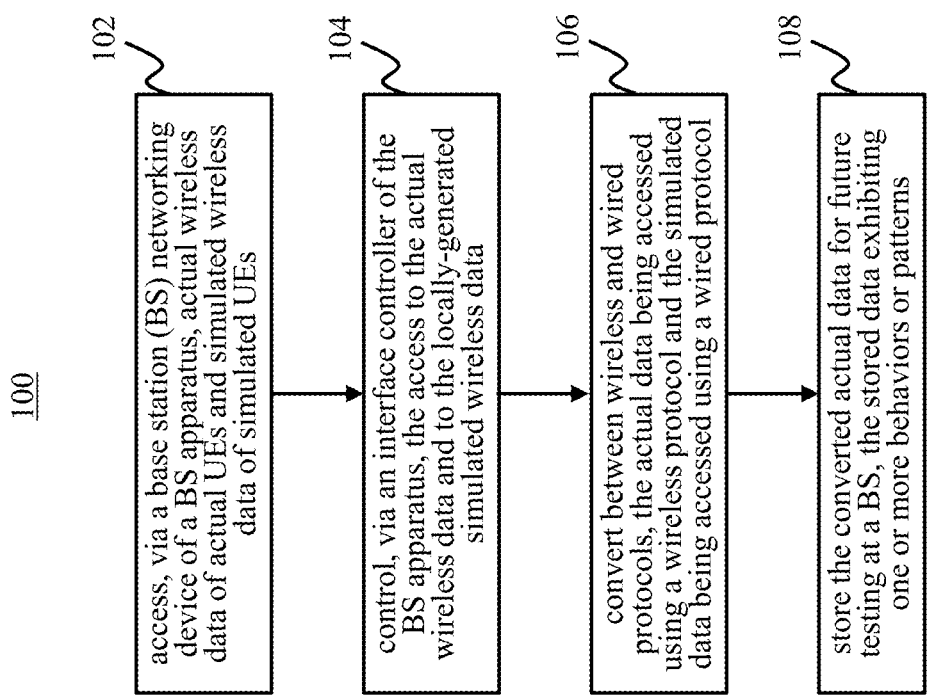
FIG. 3 illustrates a method for preparing a simulator for a networking system that comprises base stations and user equipment, in accordance with one or more embodiments.
Figure 4:
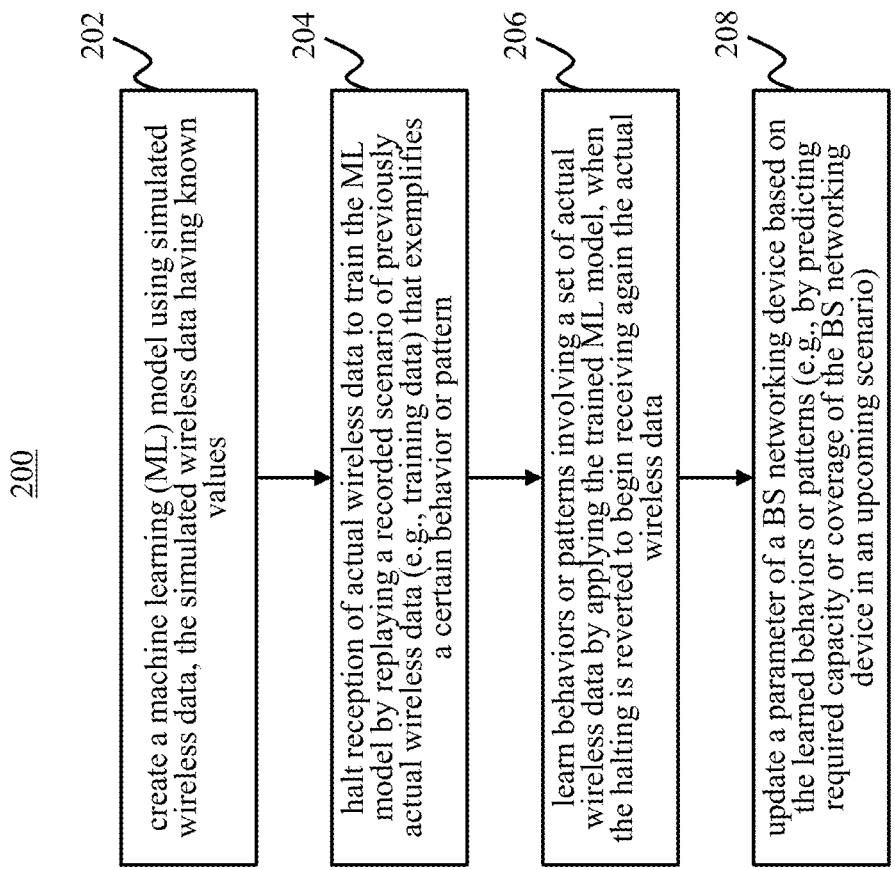
FIG. 4 illustrates a method for preparing and using machine learning models for improving communication in the networking system, in accordance with one or more embodiments.
Figure 5:
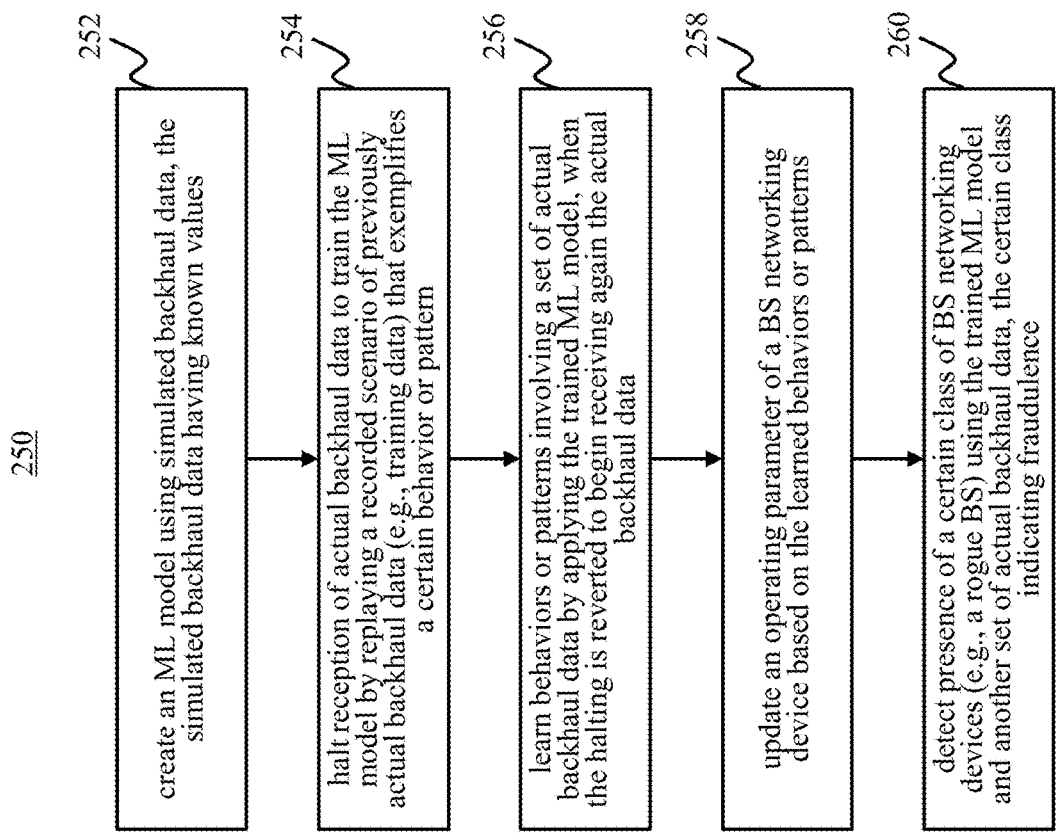
FIG. 5 illustrates a method for preparing and using machine learning models for improving detection of fraudulent activity on a wired, backhaul network of the networking system, in accordance with one or more embodiments.

FIG. 3 illustrates method 100 for preparing a simulator for a networking system, in accordance with one or more embodiments. And FIGS. 4-5 illustrate methods 200 and 250 for preparing a machine learner, in accordance with one or more embodiments. Each of methods 100, 200, and 250 may be performed with a computer system comprising one or more computer processors and/or other components. The processors are configured by machine readable instructions to execute computer program components. The operations of methods 100, 200, and 250 presented below are intended to be illustrative. In some embodiments, methods 100, 200, and 250 may be accomplished with one or more additional operations not described, and/or without one or more of the operations discussed. Additionally, the order in which the operations of methods 100, 200, and 250 are illustrated in FIGS. 3-5 and described below is not intended to be limiting. In some embodiments, methods 100, 200, and 250 may each be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of methods 100, 200, and 250 in response to instructions stored electronically on an electronic storage medium. The processing devices may include one or more devices configured through hardware, firmware, and/or software to be specifically designed for execution of one or more of the operations of methods 100, 200, and 250.

At operation 102 of method 100, actual wireless data of actual UEs and simulated wireless data of simulated UEs may be accessed, via a base station (BS) networking device of a BS apparatus. As an example, BS networking device of BS apparatus 60-1 may remotely obtain actual cellular data from UE 90 and locally-generated (e.g., simulated) cellular data from UE simulation component 34 (shown in FIG. 1 and described herein). In another example, the BS networking device of BS apparatus 60-1 may remotely obtain actual GPS data from satellite 80 and locally-generated (e.g., simulated) GPS data from GPS simulation component 36 (shown in FIG. 1 and described herein).

At operation 104 of method 100, the access to the actual wireless data and to the locally-generated simulated wireless data may be controlled, via an interface controller of the BS apparatus. As an example, interface control component 30 (shown in FIG. 1 and described herein) may enable (e.g., via switch 55 of FIG. 1) the access to the actual wireless data when a simulation is being prepared. In another example, interface control component 30 may disable (e.g., via switch 55 of FIG. 1) the access to the actual wireless data and enable the access to the simulated wireless data when a simulation is being performed. In another example, interface control component 30 may enable or disable (e.g., via switch 56 of FIG. 1) the access to the actual GPS data, and it may enable or disable the access to the simulated GPS data depending on whether a simulation is being prepared or performed, respectively.

At operation 106 of method 100, a conversion may occur between wireless and wired protocols, the actual data being accessed using a wireless protocol and the simulated data being accessed using a wired protocol. As an example, bridge 50 (shown in FIG. 1 and described herein) may convert actual cellular data to Ethernet frames. In this or another example, bridge 50 may convert Ethernet frames to the cellular data format. In another example, bridge 51 (shown in FIG. 1 and described herein) may convert between actual GPS data and Ethernet frames.

At operation 108 of method 100, the converted actual data may be stored for future testing at a BS, the stored data exhibiting one or more behaviors or patterns. As an example, UE simulation component 34 may store the converted data in electronic storage 22, for replaying in a simulation. In another example, GPS simulation component 36 may store the converted data in electronic storage 22, for replaying in another simulation.

At operation 202 of method 200, a machine learning (ML) model may be created using simulated wireless data, the simulated wireless data having known values. As an example, model 40-2 may be developed by training component 32 (shown in FIG. 1 and described herein) using simulated cellular data obtained via UE simulation component 34 and electronic storage 22. In another example, model 40-2 may be developed by training component 32 using simulated GPS data obtained via GPS simulation component 36 and electronic storage 22.

At operation 204 of method 200, reception of actual wireless data may be halted to train the ML model by replaying a recorded scenario of previously actual wireless data (e.g., training data) that exemplifies a certain behavior or pattern. As an example, interface control component 30 may disable actual wireless traffic at switch 55 and/or 56. In some embodiments, training component 32 may divide or split training data 40-1 (shown in FIG. 1 and described herein) into training, validation, and test datasets, in any suitable fashion. In this example, 80% of the training data may be used for training or validation, and the other 20% may be used for validation or testing. At least some of the training data may be labeled. In some embodiments, training component 32 may train machine-learning prediction model 40-2 using the split training data (e.g., comprising labeled training data and unlabeled test data). In some implementations, the validation data may be used to configure the hyperparameters of the model. As an example, UE simulation component 34 may obtain actual cellular data from electronic storage 22 and feed this data in a fashion that mimics live cellular data into the BS networking device of BS apparatus 60-1, for performing model 40-2 training. In another example, GPS simulation component 36 may obtain actual GPS data from electronic storage 22 and feed this data in a fashion that mimics live GPS data into the BS networking device of BS apparatus 60-1, for performing model 40-2 training.

Models database 40-2 may comprise several different machine learning models. For example, one model 40-2, for training on wireless data originally captured from UEs 90-91, may be different from another model 40-2, for training on wireless data originally captured from satellite 80. Prediction models 40-2 may each be tested to see if it has converged. In some implementations, model convergence implies training a model to the extent that validation results of the model are satisfactory. In some embodiments, convergence occurs once the model is sufficiently trained. And, in other embodiments, convergence occurs once the model is sufficiently validated or tested. In some embodiments, training component 32 may achieve convergence for a model, when classification errors with respect to the validation dataset are minimized.

At operation 206 of method 200, behaviors or patterns involving a set of actual wireless data may be learned by applying the trained ML model, when the halting is reverted to begin receiving again the actual wireless data in real-time. As an example, after interface control component 30 reenables actual wireless traffic at switch 55, UE simulation component 34 may employ trained model 40-2 to learn new features of live cellular data. In another example, after interface control component 30 reenables actual wireless traffic at switch 56, GPS simulation component 36 may employ another, trained model 40-2 to learn new features of live GPS data.

At operation 208 of method 200, one or more parameters of a BS networking device may be updated based on the newly learned behaviors or patterns. As an example, UE simulation component 34 may leverage these new features to predict required capacity or coverage of the BS networking device in an upcoming scenario. In another example, GPS simulation component 36 may leverage other, new features to predict an operating parameter of the BS networking device in an upcoming scenario.

At operation 252 of method 250, an ML model using simulated backhaul data may be created, the simulated backhaul data having known values. As an example, model 40-2 may be developed by training component 32 (shown in FIG. 1 and described herein) using simulated backhaul data obtained via BS simulation component 38 and electronic storage 22.

At operation 254 of method 250, reception of actual backhaul data may be halted to train the ML model by replaying a recorded scenario of previously actual backhaul data (e.g., training data) that exemplifies a certain behavior or pattern. As an example, interface control component 30 may disable actual backhaul traffic at a switch of BS apparatus 60. In some embodiments, training component 32 may divide or split training data 40-1 (shown in FIG. 1 and described herein) into training, validation, and test datasets, in any suitable fashion. In some embodiments, training component 32 may train machine-learning prediction model 40-2 using the split training data (e.g., comprising labeled training data and unlabeled test data). As an example, BS simulation component 38 may obtain actual backhaul data from electronic storage 22 and feed this data in a fashion that mimics live backhaul data into the BS networking device of BS apparatus 60-1, for performing model 40-2 training.

At operation 256 of method 250, behaviors or patterns involving a set of actual backhaul data may be learned by applying the trained ML model, when the halting is reverted to begin receiving again the actual backhaul data. As an example, after interface control component 30 reenables actual backhaul traffic at the switch, BS simulation component 38 may employ trained model 40-2 to learn new features of live backhaul data.

At operation 258 of method 250, an operating parameter of a BS networking device may be updated based on the newly learned behaviors or patterns. As an example, BS simulation component 38 may leverage these new features to predict an operating parameter of the BS networking device in an upcoming scenario.

At operation 260 of method 250, presence of a certain class of BS networking devices (e.g., a rogue BS) may be detected using the trained ML model and another set of actual backhaul data, the certain class indicating fraudulence. As an example, BS simulation component 38 may apply this model to predict presence of a fraudulent BS networking device.

Techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Several embodiments of the invention are specifically illustrated and/or described herein. However, it will be appreciated that modifications and variations are contemplated and within the purview of the appended claims.

What is claimed is:

1. A base station apparatus configured to provide communication for one or more user equipment (UEs), the base station apparatus comprising:
    a base station networking device configured to access a conversion of (i) actual wireless data pertaining to actual radio frequency (RF) energy of an environment including actual UEs and (ii) simulated wireless data pertaining to simulated RF energy of an environment including simulated UEs;
    an interface controller communicably interposed between the base station networking device and the UEs, wherein the interface controller is configured to control the access by halting reception of the actual wireless data such that the access thereafter consists of reception of the simulated wireless data; and
    a bridging device configured to perform, at a lowest layer of a communications stack thereof, the conversions from a wireless protocol to a wired protocol without adjusting a format of the wireless data, wherein the accesses are of protocol data units (PDUs) that (i) comprise the converted data and (ii) are inserted at a higher layer of the communications stack.

2. The base station apparatus of claim 1, wherein the actual wireless data is received and transmitted by one or more antennas using the wireless protocol, and
    wherein the converted simulated wireless data is received using the wired protocol.

3. The base station apparatus of claim 2, wherein the wireless protocol is one or more of 2G cellular, 3G cellular, 4G cellular, 4G long term evolution (LTE) cellular, 5G cellular, Wi-Fi, radio frequency identification (RFID), Bluetooth, and Zigbee, and
    wherein the wired protocol is one or more of Ethernet, universal serial bus (USB), synchronous optical networking (SONET), synchronous digital hierarchy (SDH), point-to-point protocol (PPP), high-level data link control (HDLC), digital subscriber line (DSL), integrated services digital network (ISDN), fiber distributed data interface (FDDI), and advanced data communication control procedures (ADCCP).

4. The base station apparatus of claim 1, wherein the base station apparatus is further configured to provide communication for the base station networking device and one or more other base station networking devices of one or more other base station apparatuses, via the wired protocol.

5. The base station apparatus of claim 1, further comprising:
a processor configured to generate the simulated wireless data and to perform a simulation of network traffic in a closed network.

6. The base station apparatus of claim 5, wherein the base station apparatus is tested for resolution of an intermittent problem by automatically varying one or more of base station networking device parameter settings, simulated wireless interference, and a number of the simulated UEs that are generating traffic to a level that satisfies a congestion criterion.

7. The base station apparatus of claim 1, wherein the interface controller and the bridging device are integrated into an existing cellular system, and
wherein the base station networking device is a hub, switch, repeater, bridge, or router.

8. The base station apparatus of claim 1, further comprising:
a processor configured to generate simulated global positioning system (GPS) data such that the base station networking device emulates being in different locations; and
another interface controller communicably interposed between the base station networking device, an actual GPS device, and the processor.

9. The base station apparatus of claim 1, wherein the interface controller is configured to simultaneously receive the actual and simulated wireless data.

10. The base station apparatus of claim 1, further comprising:
a machine learning model trained using converted simulated wireless data, the simulated wireless data having known values.

11. The base station apparatus of claim 10, wherein the machine learning model is applied to converted actual wireless data at the base station networking device, the base station networking device being a router.

12. A method, comprising:
accessing a conversion of actual data pertaining to actual RF energy of an environment including actual UEs in a wireless communications network;
receiving a conversion of simulated data pertaining to simulated RF energy of an environment including simulated UEs;
controlling the accessed data and the received data by halting reception of the actual data at a base station networking device such that the base station networking device thereafter receives the received data; and
the converting, at a lowest layer of a communications stack, from a wireless protocol to a wired protocol, without adjusting a format of the data, wherein the access and the reception are of PDUs that (i) comprise the converted data and (ii) are inserted at a higher layer of the communications stack,
wherein the actual data is received and transmitted by one or more antennas using the wireless protocol, and
wherein the converted simulated data is received using the wired protocol.

13. The method of claim 12, further comprising:
storing the actual data, wherein the actual data exemplifies a behavior or pattern.

14. The method of claim 13, further comprising:
receiving, from the simulated UEs, other simulated data that comprises the stored data such that a response of a networking node to the behavior or pattern is tested.

15. The method of claim 14, further comprising:
determining required capacity of the node for a future scenario different from one that exemplifies the behavior or pattern.

16. The method of claim 12, wherein the actual UEs are remote from a node that performs the accessing of the actual data, and
wherein the simulated UEs are local to the node.

17. The method of claim 12, wherein the actual and simulated data are cellular traffic.

18. A computer-implemented method of operating a base station apparatus configured to provide communication for one or more user equipment (UEs), the method comprising:
accessing, via a base station networking device, a conversion of (i) actual wireless data pertaining to actual RF energy of an environment including actual UEs and (ii) simulated wireless data pertaining to simulated RF energy of an environment including simulated UEs;
controlling, via an interface controller of the base station apparatus, the access by halting reception of the actual wireless data such that the access thereafter consists of reception of the simulated wireless data; and
the converting, via a bridging device of the base station apparatus at a lowest layer of a communications stack thereof, from a wireless protocol to a wired protocol without adjusting a format of the wireless data, wherein the accesses are of PDUs that (i) comprise the converted data and (ii) are inserted at a higher layer of the communications stack.

19. The computer-implemented method of claim 18, wherein the actual wireless data is received and transmitted by one or more antennas using the wireless protocol,
wherein the converted simulated wireless data is received using the wired protocol,
wherein the interface controller is controlled by one or more processors, and
wherein the simulated wireless data is generated by the one or more processors.

* * * * *